United States Patent
Shapiro

(10) Patent No.: US 7,732,696 B1
(45) Date of Patent: Jun. 8, 2010

(54) INSTANTLY PLAYABLE STRINGED INSTRUMENT AND METHOD OF USE THEREOF

(76) Inventor: Lee Shapiro, 142 Kensington Dr., Fort Lee, NJ (US) 07024

(*) Notice: Subject to any disclaimer, the term of this patent is extended or adjusted under 35 U.S.C. 154(b) by 0 days.

(21) Appl. No.: 12/187,206

(22) Filed: Aug. 6, 2008

Related U.S. Application Data

(60) Provisional application No. 60/954,243, filed on Aug. 6, 2007.

(51) Int. Cl.
*G09B 15/00* (2006.01)
(52) U.S. Cl. ................... 84/485 R; 84/477 R
(58) Field of Classification Search ............ 84/485 R, 84/454, 485 SR, 477 R
See application file for complete search history.

(56) References Cited

U.S. PATENT DOCUMENTS

| | | | |
|---|---|---|---|
| 1,852,853 A | | 4/1932 | Nichols |
| 2,496,191 A | | 1/1950 | Zipperstein et al. |
| 2,788,694 A | | 4/1957 | Dearth |
| 3,820,434 A | | 6/1974 | Roberts |
| 3,837,255 A | * | 9/1974 | Starns et al. ............ 84/317 |
| 3,978,756 A | | 9/1976 | Feldman |
| 4,080,867 A | | 3/1978 | Ratanangsu |
| 4,175,468 A | * | 11/1979 | Whitlock ............ 84/485 SR |
| 4,417,497 A | | 11/1983 | Nicklaus |
| 4,471,682 A | | 9/1984 | Bozung |
| 4,559,861 A | | 12/1985 | Patty et al. |
| 4,987,815 A | | 1/1991 | Shockley |
| 5,524,522 A | | 6/1996 | Hesnan |
| 6,111,179 A | | 8/2000 | Miller |
| 6,175,069 B1 | | 1/2001 | Longacre |
| 6,191,348 B1 | | 2/2001 | Johnson |
| 6,288,315 B1 | | 9/2001 | Bennett |
| 6,291,755 B1 | * | 9/2001 | Hine et al. ............ 84/454 |
| 6,660,921 B2 | | 12/2003 | Deverich |
| 6,753,466 B1 | | 6/2004 | Lee |
| 6,870,084 B2 | | 3/2005 | Feiten et al. |
| 6,870,085 B2 | | 3/2005 | MacCutcheon |
| 6,984,780 B2 | | 1/2006 | Reierson |
| 7,015,387 B2 | | 3/2006 | Chen |
| 7,161,080 B1 | | 1/2007 | Barnett |
| 2004/0149118 A1 | | 8/2004 | Gerardi et al. |
| 2005/0011331 A1 | | 1/2005 | Murrell |
| 2005/0011334 A1 | | 1/2005 | Murrell |
| 2005/0011335 A1 | | 1/2005 | Murrell |
| 2005/0016353 A1 | | 1/2005 | Reierson |
| 2006/0123971 A1 | | 6/2006 | Moghaddam |
| 2006/0191398 A1 | | 8/2006 | Sternal |

(Continued)

*Primary Examiner*—Jianchun Qin
(74) *Attorney, Agent, or Firm*—Schmeiser, Olsen & Watts LLP

(57) ABSTRACT

An instantly playable stringed instrument having a body, neck and fret spaces is provided. The instrument includes a plurality of strings. The strings are tuned such that in combination the sound they produce is an open E minor chord. The instantly playable stringed instrument may further include a plurality of indicators, each indicator corresponding to one fret space. Each indicator indicates a minor chord to be played by depressing all the strings within the fret space the indicator is associated with. The stringed instrument may further include a minor third string that has a color identification to distinguish it from the rest of the plurality of strings. The minor third string may be depressed on an adjacent fret space thereby converting the minor chord associated with the fret space having all strings depressed to a major chord.

11 Claims, 3 Drawing Sheets

U.S. PATENT DOCUMENTS

2007/0034070 A1 2/2007 Hammond
2007/0051226 A1 3/2007 Diaz
2007/0131082 A1 6/2007 Feiten et al.

* cited by examiner

INSTANTLY PLAYABLE STRINGED INSTRUMENT AND METHOD OF USE THEREOF

CROSS REFERENCE TO RELATED APPLICATION

This application is claims priority to U.S. Provisional Patent Application entitled "INSTANTLY PLAYABLE STRINGED INSTRUMENT AND METHOD OF USE THEREOF," Ser. No. 60/954,243, filed Aug. 6, 2007, the disclosure of which is hereby incorporated entirely herein by reference.

BACKGROUND OF THE INVENTION

1. Technical Field

This invention relates generally to a stringed instrument and more particularly to an instantly playable stringed instrument that enables a player to instantly and with reduced effort play every chord available with the use of one, two or three fingers.

2. State of the Art

Guitars have been around for centuries in various forms, shapes and sizes. The guitar that is commonly known by people of today, the six string guitar, took on its modern shape and dimensions beginning in the early nineteenth century. The guitar has become a popular instrument that many people love to play and many more would like to learn how to play.

Conventional guitars, as well as other conventional stringed instruments, such as but not limited to ukuleles, banjos and bass guitars, require some form of lessons in order to play chords on the instruments. These lessons come in various forms, such as live instruction from a guitar teacher, video instruction, interactive CD instruction, and instruction books and lesson manuals, for example. Learning even the basic chords can at times be challenging and take more time than a person may initially anticipate. Due to the notes that each string of the guitar is tuned to, the chords are set as to how they may be played and the finger positions are not always intuitive and at times difficult for beginners. In addition, the conventional guitar may utilize several completely different and often very difficult finger-configurations for the same chord, which serves to further complicate the learning and increase the difficulty of mastering sonic clarity.

Accordingly, what is needed is a guitar that can be instantly played by any person without the need for lessons.

DISCLOSURE OF THE INVENTION

The present invention relates to an instantly playable stringed instrument wherein the instrument is tuned such that a user may play chords without the need for lessons or formal instruction. The instant play stringed instrument includes indicators for indicating where on the guitar neck to play chords and may include an integral tuner.

An aspect of the present invention includes an instant play stringed instrument having a body, neck and fret spaces comprising a plurality of strings. The strings are tuned such that, in combination, the sound they produce is an open E minor chord. The instant play stringed instrument may further include a plurality of indicators, each indicator corresponding to one fret space. Each indicator indicates the fret space location of each minor chord to be played by depressing all the strings within the fret space the indicator is associated with. The stringed instrument may further include a minor third string that has a color identification to distinguish it from the rest of the plurality of strings. The minor third string may be depressed on an adjacent fret space thereby converting the minor chord associated with the fret space having all strings depressed to a major chord. Further still, the instantly playable stringed instrument may include a tuner integral with the body of the instrument for tuning the plurality of strings to its unconventional note sequence.

Another aspect of the present invention includes a method of playing an instantly playable stringed instrument. The method includes tuning a plurality of strings of the instrument such that they produce an open E minor chord. The method may also comprise depressing all strings within a first fret space with a first, single finger to produce a different minor chord. The method further comprises depressing a minor third string of the instrument on a second fret space adjacent to the first fret space with a second, single finger to produce a major chord and strumming the plurality of strings. The method may further include depressing another string with a third, single finger to play other chord variations; each described fingering configuration being more natural to the human hand than in the conventional method.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to an instantly playable stringed instrument wherein the instrument is tuned such that a user may play chords without the need for lessons or formal instruction. The instant play stringed instrument includes indicators for indicating how to play chords and may include an integral tuner.

Figure 1A:
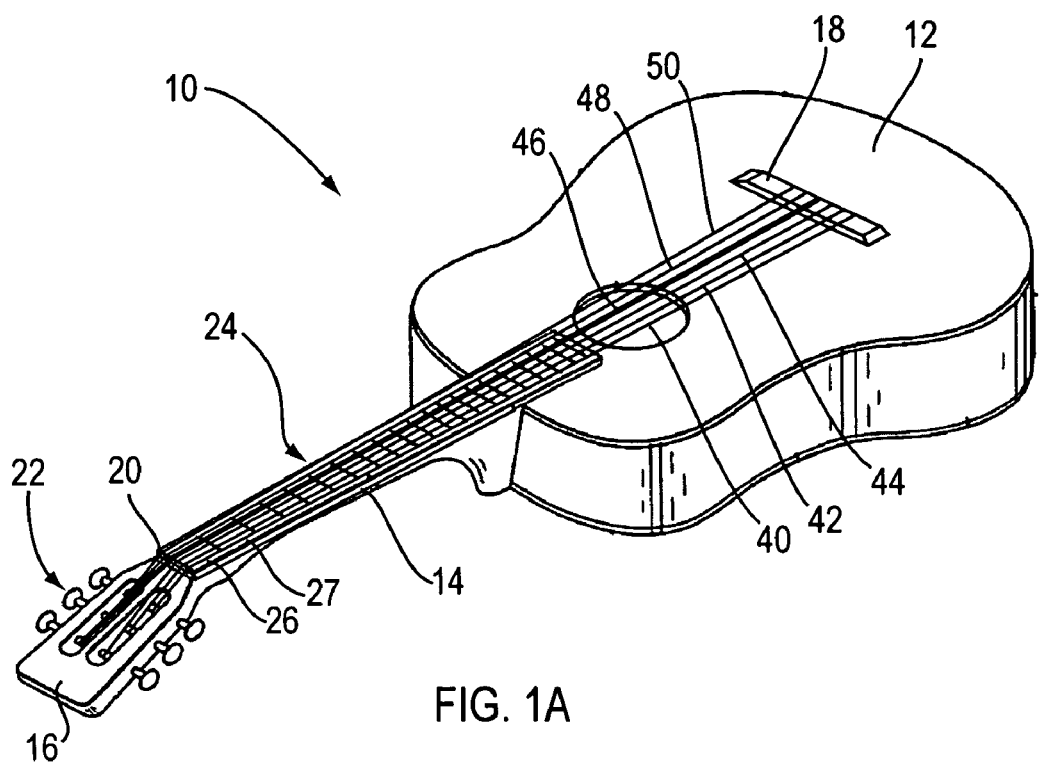
FIG. 1A is a front view of a stringed instrument in accordance with the present invention.
Figure 1B:
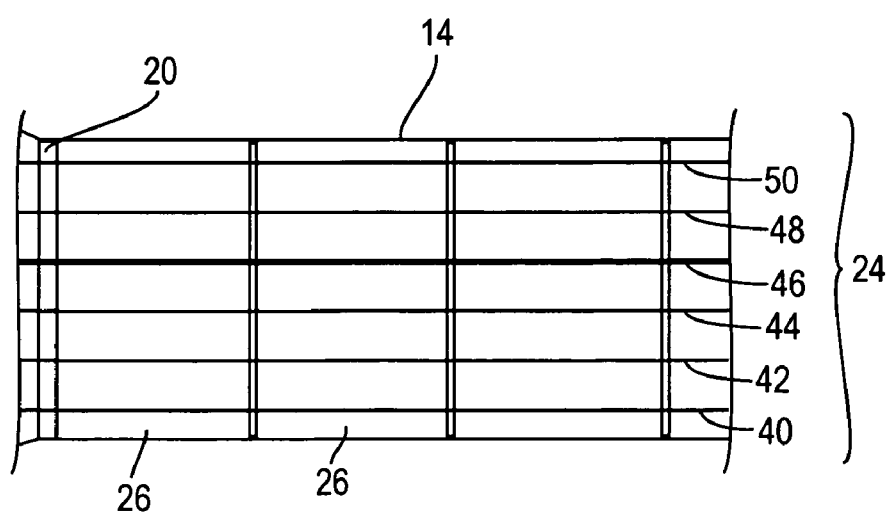
FIG. 1B is a front view of an enlarged view of the neck of the stringed instrument of FIG. 1A.
Figure 2:
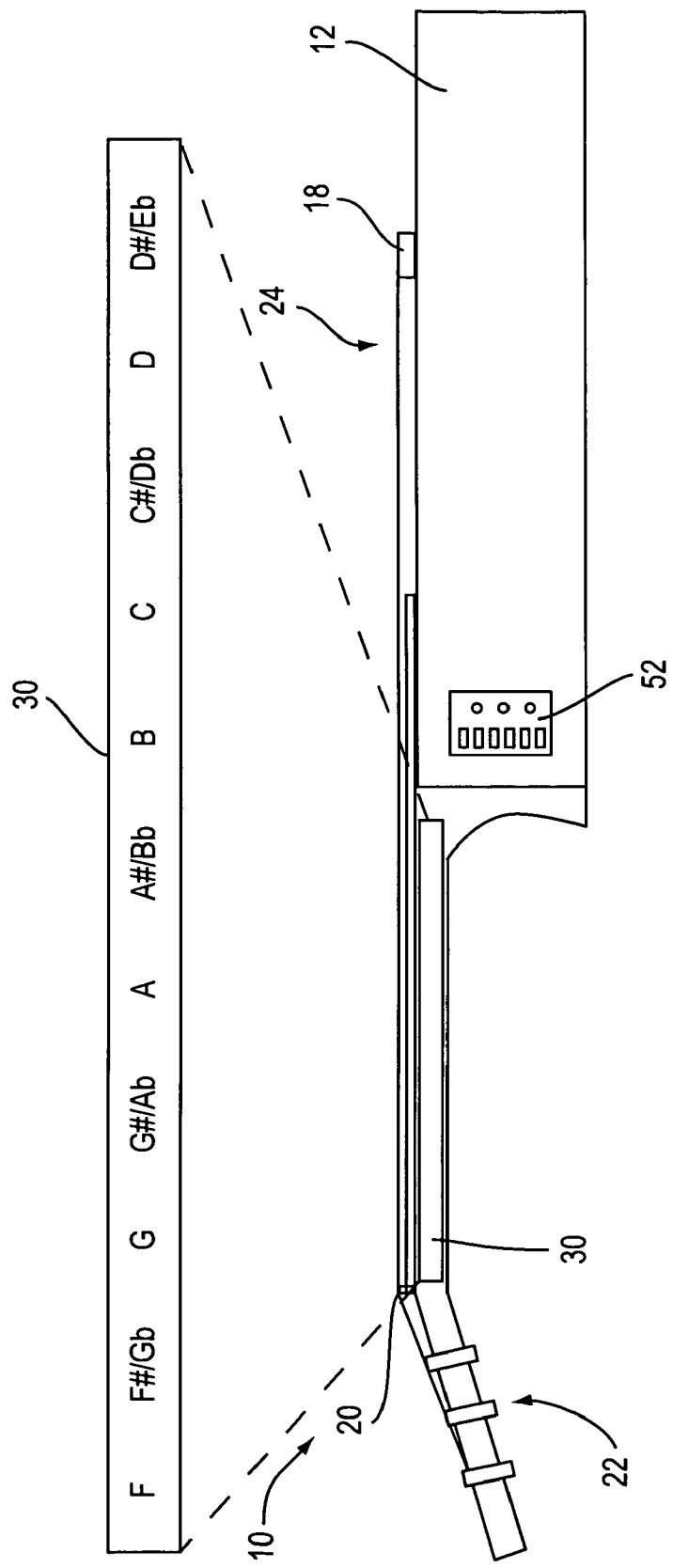
FIG. 2 is a side view of a stringed instrument in accordance with the present invention.

According to particular embodiments of the present invention and for the exemplary purposes of the present invention, FIGS. 1A, 1B and 2 depict a stringed instrument that is a guitar 10. It will be understood that any stringed instrument having common features of a guitar are contemplated with regard to the present invention. These other stringed instruments include, but are not limited to, ukuleles, banjos and bass guitars. The guitar 10 may include a body 12, a neck 14, a head 16 and a plurality of strings 24. The plurality of strings 24 may be fixed on one end to a bridge 18 and on the other end to a tuning mechanism 22, where in the plurality of strings 24 pass through a nut 20 in order to maintain proper spacing of the plurality of strings 24. The tuning mechanism 22 may be used to adjust the tension in each of the plurality of strings 24 in order to allow each string 24, when plucked, to produce a particular pitch. The tuning mechanism 22 is common among stringed instruments and allows each string to be tuned to a different pitch.

The plurality of strings 24 may include six strings 40, 42, 44, 46, 48 and 50, wherein string 40 is the string producing the lowest tone and string 50 is the string producing the highest tone. According to particular embodiments of the present invention, the plurality of strings 24 may be tuned to an open E minor chord. An open E minor chord is one in which strumming all of the plurality of strings without depressing any of the plurality of strings 24 results in the playing of an E minor chord. Accordingly, to tune the guitar 10 to an open E minor chord, string 40 is tuned to an E, string 42 is tuned to a B, string 44 is tuned to an E, string 46 is tuned to a G, string 48 is tuned to a B, and string 50 is tuned to an E. In this configuration of tuning, string 46 is the minor third string. String 46 may be distinguished from the rest of the plurality of strings 24 by a color indication, such as red. It will be understood that any color or indication type may be used, so long as string 46 is distinguishable from the rest of the plurality of strings 24.

The guitar 10 then allows a user to play various minor chords by simply barring a fret space 26. Barring a fret space 26 includes depressing each string of the plurality of strings 24 within the same fret space 26. The guitar 10 further includes a plurality of indicators, each indicator 30 corresponding to one fret space 26. Each indicator 30 indicates the location and name of a minor chord to be played by depressing all the strings 24 within the fret space 26 the indicator 30 is associated with. Therefore, in order to play an F minor, the user would depress all of the strings 24 within the fret space 26, which fret space 26 is associated with the F indicator.

The guitar 10 is configured such that the depressing of the minor third string 46 on an adjacent fret converts the minor chord associated with the fret having all strings depressed to a major chord. For example and without limitation, a user may depress all of the strings 24 within the first fret space 26 associated with an F minor chord by use of a first finger. The user may then use a second finger to depress the minor third string 46 in the adjacent fret space 27. This converts an F minor chord to an F major chord. Further still a third finger may be used to play other variations of the minor or major chords such as 7ths, sus 4s, minor 7ths, etc.

The plurality of indicators 30 may be positioned in the order of E, F, F#/Gb, G, G#/Ab, A, A#/Bb, B, C, C#/Db, D, and D#/Eb, wherein the F indicator is positioned corresponding to the fret space next to the nut 20 and the rest of the indicators are in order corresponding to each next fret space in the direction from the nut 20 to the bridge 18.

The guitar 10 may further include a tuner 52. The tuner 52 may be integral with the guitar 10 in order to allow the user the ability to tune the guitar 10 wherever the user is. The tuner 52 may be any type of tuner, such as, but not limited to a piezo-electric tuner.

Figure 3:
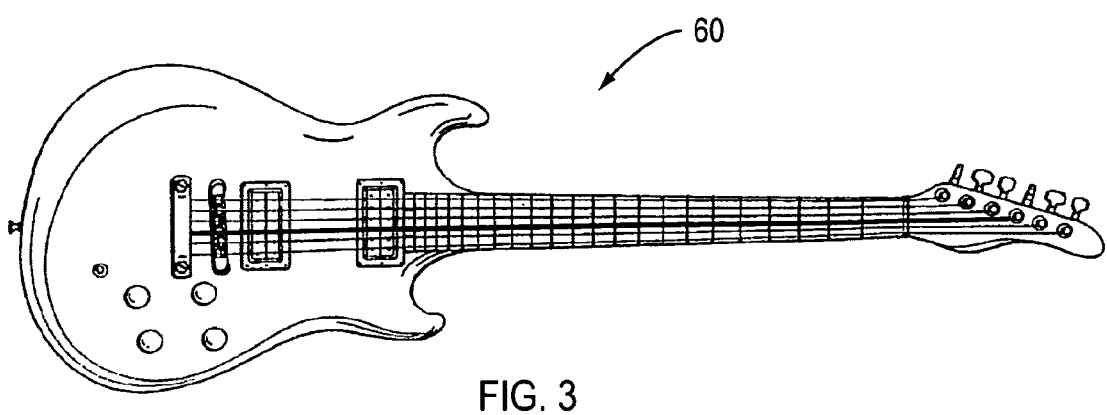
FIG. 3 is a front view of an electric stringed instrument in accordance with the present invention.

Referring further to the drawings, FIG. 3 depicts a guitar 60 according to particular embodiments of the present invention. The guitar 60 is an electric guitar. It is understood that the present invention may be applied to stringed instruments that are both acoustic and electric in form.

Figure 4:
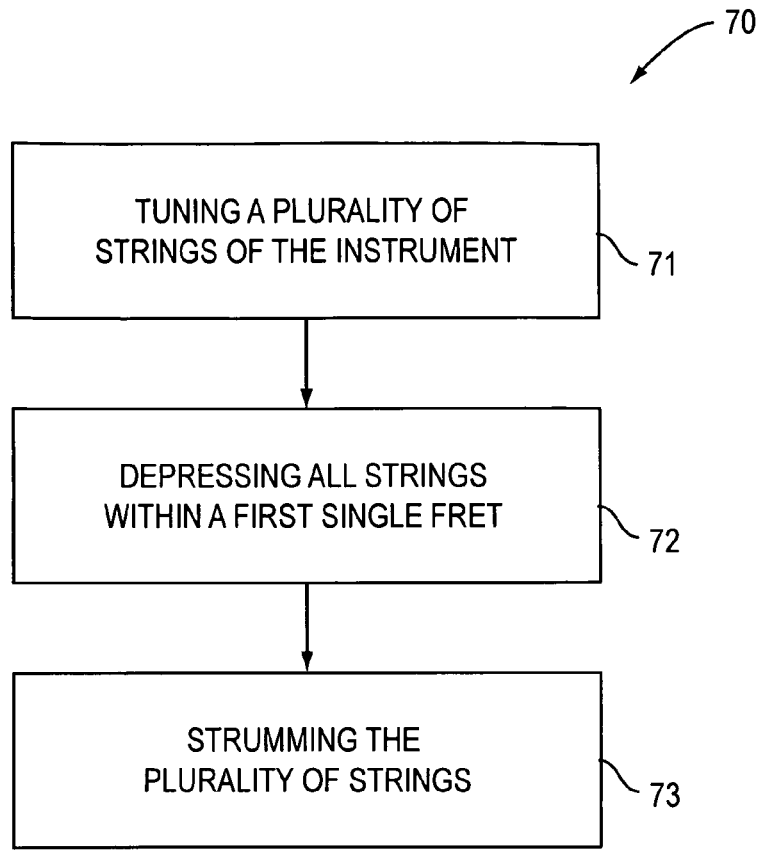
FIG. 4 is a flow chart showing a method of playing a stringed instrument in accordance with the present invention.

As shown in FIG. 4, another embodiment of the present invention includes a method 70 of playing an instant play stringed instrument. The method includes tuning a plurality of strings of the instrument to an unconventional note sequence such that they produce an open E minor chord (Step 71). The method 70 may also comprise depressing all strings within a first single fret space with a first finger to produce a first minor chord different from an E minor chord (Step 72). The method 70 may also include strumming the plurality of strings (Step 73). The method 70 may have many additional steps. For example, the method 70 further comprises depressing a minor third string of the instrument on a second fret space adjacent to the first fret space with a second finger to produce a major chord. The method 70 may further include depressing another string with a third finger to play other chord variations. Further still, the method 70 may include providing fingering configurations that are more natural to the human hand than conventional fingering configurations.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An instant play stringed instrument having a body and a neck, the instrument comprising:
    a plurality of fret spaces designated on the neck;
    a plurality of strings coupled to the body and neck, the plurality of strings overlaying the plurality of fret spaces;
    a plurality of indicators, each indicator corresponding to one fret space, wherein each indicator is adapted to indicate the fret space location of each minor chord playable by depressing all the strings within the fret space corresponding to the indicator; and
    a minor third string having a color identification configured to distinguish the minor third string from the other strings of the plurality of strings, wherein the minor third string is configured to be depressed on a fret space adjacent another fret space having all the strings depressed, thereby converting the minor chord to a major chord.

2. The instrument of claim 1, further comprising a tuner integrated with the body of the instrument, the tuner adapted to tune the plurality of strings.

3. The instrument of claim 1, wherein the instant play stringed instrument is a guitar.

4. The instrument of claim 3, wherein the guitar is an acoustic guitar.

5. The instrument of claim 3, wherein the guitar is an electric guitar.

6. The instrument of claim 1, wherein the plurality of strings are adapted to be tuned to an E minor open chord.

7. An instant play guitar having a body and a neck, the guitar comprising:
    a plurality of fret spaces designated on the neck;
    a plurality of strings coupled to the body and neck, the plurality of strings overlaying the plurality of fret spaces;
    a plurality of indicators, each indicator corresponding to one fret space, wherein each indicator is adapted to indicate the fret space location of each minor chord playable by depressing all the strings within the fret space corresponding to the indicator; and
    a minor third string having a color identification configured to distinguish the minor third string from the other strings of the plurality of strings, wherein the minor third string is configured to be depressed on a fret space adjacent another fret space having all the strings depressed, thereby converting the minor chord to a major chord.

8. The guitar of claim 7, further comprising a tuner integrated with the body of the instrument, the tuner adapted to tune the plurality of strings.

9. The guitar of claim 7, wherein the guitar is an acoustic guitar.

10. The guitar of claim 7, wherein the guitar is an electric guitar.

11. The guitar of claim 7, wherein the plurality of strings are adapted to be tuned to an E minor open chord.

* * * * *